(12) United States Patent  
Anderson

(10) Patent No.: US 6,959,553 B2  
(45) Date of Patent: Nov. 1, 2005

(54) SYSTEMS AND METHODS FOR DESIGNING THREADS OF TURBINE ENGINE CONNECTORS

(75) Inventor: William Carl Anderson, Springdale, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/684,244

(22) Filed: Oct. 13, 2003

(65) Prior Publication Data

US 2004/0077414 A1 Apr. 22, 2004

Related U.S. Application Data

(62) Division of application No. 09/822,089, filed on Mar. 30, 2001, now Pat. No. 6,659,878.

(51) Int. Cl.[7] .............................. F02C 7/20; F02K 3/06
(52) U.S. Cl. .......................................... 60/797; 244/54
(58) Field of Search ......................... 60/796, 797, 798; 244/54; 470/18–21, 23, 25, 26; 248/554–557

(56) References Cited

U.S. PATENT DOCUMENTS

| | | | | |
|---|---|---|---|---|
| 3,844,115 A | * | 10/1974 | Freid ........................... 60/797 |
| 4,055,041 A | * | 10/1977 | Adamson et al. ............. 60/797 |
| 4,117,563 A | * | 10/1978 | Fredd ........................... 470/80 |
| 4,408,418 A | * | 10/1983 | Corrette ........................ 451/48 |
| 4,423,893 A | * | 1/1984 | Holmes ....................... 285/334 |
| 4,571,936 A | * | 2/1986 | Nash et al. ................... 60/797 |
| 4,958,973 A | * | 9/1990 | Sugimura .................... 285/333 |
| 5,014,411 A | * | 5/1991 | Bonstein ................... 29/525.11 |
| 5,782,078 A | * | 7/1998 | Brantley ....................... 60/797 |
| 6,131,850 A | * | 10/2000 | Hey et al. ...................... 244/54 |
| 6,330,985 B1 | * | 12/2001 | Manteiga et al. ............. 244/54 |
| 6,537,220 B1 | * | 3/2003 | Friemel et al. ............. 600/447 |
| 6,659,878 B2 | * | 12/2003 | Anderson ..................... 470/18 |

* cited by examiner

Primary Examiner—Ted Kim  
(74) Attorney, Agent, or Firm—Armstrong Teasdale LLP; William Scott Andes

(57) ABSTRACT

A connector that receives a threaded apparatus and reduces stresses induced from the treaded apparatus into the connector is described. The connector includes a top side, a bottom side, and an opening that extends therethrough. The opening is defined by an inner surface that includes a threadform including a plurality of threads. The threads extend radially outward from the inner surface into the connector opening and include a first thread portion and a cutback that extends through a portion of the threadform. The cutback facilitates less stresses being induced into the first thread portion.

8 Claims, 4 Drawing Sheets

SYSTEMS AND METHODS FOR DESIGNING THREADS OF TURBINE ENGINE CONNECTORS

CROSS REFERENCE TO RELATED APPLICATIONS

This application is a divisional of U.S. application No. 09/822,089, filed Mar. 30, 2001, U.S. Pat. No. 6,659,878, issued Dec. 9, 2003, which is hereby incorporated by reference.

BACKGROUND OF THE INVENTION

This application relates generally to connectors and, more particularly, to connectors sized to receive a threaded apparatus.

Aircraft engines typically include a plurality of threaded connections that are torqued during assembly. For example, an aircraft engine may be mounted to an aircraft at various locations, such as on a wing, to a fuselage, or to a tail. The engine is typically mounted at a forward and an aft end with a mounting system that includes a plurality of thrust links including connectors at each end. The connectors include openings extending therethrough that are defined by substantially planar inner surfaces including a plurality of threads.

The thrust link connectors are exposed to potential vibrational stresses that are induced during engine operation. To minimize the effect of exposure to such vibrational stresses, threaded components are torqued. When threaded components are loaded by torque or an external load, stresses are induced within the connectors. A highest stress area typically occurs in a first thread. More specifically, a highest stress is induced into a first thread root fillet that is defined between the first thread and a subsequent thread. Continued exposure to such stresses, may weaken the first thread and reduce a low cycle fatigue capability of the threaded connection. Prolonged reduced low cycle fatigue may shorten a useful life of the threaded connection.

To facilitate improving the low cycle fatigue capability of threaded connections, the threads of at least some known threaded components are rolled to provide a surface that is pre-stressed in compression. Such a process is time-consuming. In some other known applications, thread rolling is not available and the threads are instead cut back to facilitate improving low cycle fatigue capability. However, such connections are also costly and time consuming to manufacture.

BRIEF SUMMARY OF THE INVENTION

In an exemplary embodiment, a connector for receiving a threaded component reduces stresses induced from the treaded component into the connector. The connector includes a top side, a bottom side, and an opening that extends therethrough. The opening is defined by an inner surface that includes a threadform including a plurality of threads. The threads extend radially outward from the inner surface into the connector opening and include a first thread portion and an oblique cutback that extends through a portion of the threadform.

During assembly, the threaded component is rotated within the connector opening to initially engage the connector first thread portion and the cutback. As the threaded apparatus is torqued to be secured to the connector, the cutback facilitates less stresses being induced into the first thread portion. More specifically, because of the cutback, an amount of loading that may be transferred into the first thread portion is reduced in comparison to an amount of loading that may be induced into the first thread portion without the cutback. As a result, the cutback facilitates reducing a peak stress induced in both the male and female threads of the threaded component to more evenly transfer the loading through the connector threadform. As a result, an amount of stress induced into the connector threadform is facilitated to be reduced, thus extending a useful life of the connector.

DETAILED DESCRIPTION OF THE INVENTION

Figure 1:
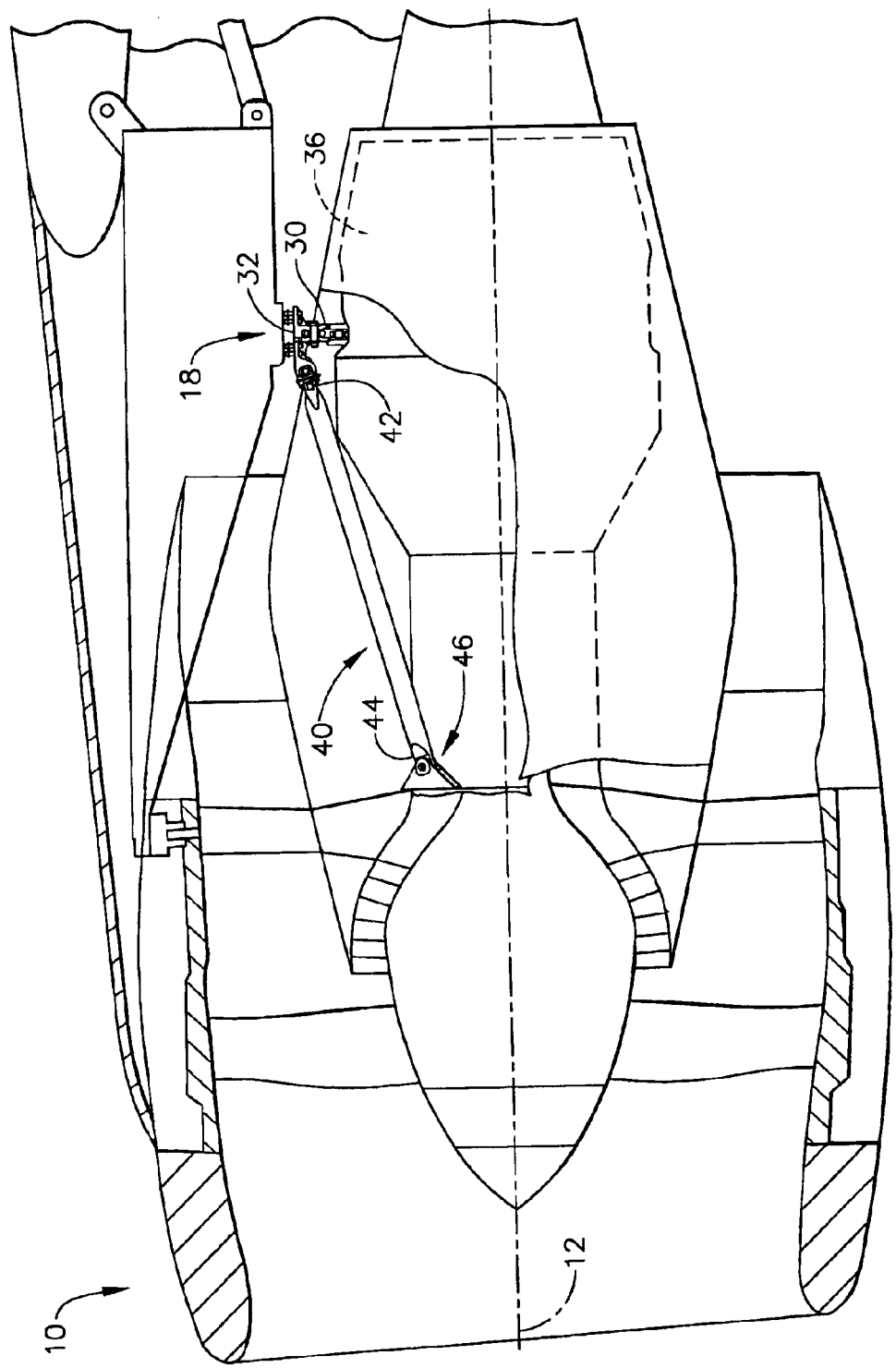
FIG. 1 is schematic illustration of a gas turbine engine including a mounting system.

FIG. 1 a schematic illustration of an exemplary embodiment of a gas turbine engine 10 having a longitudinal or axial centerline axis 12 and mounted below an aircraft wing 14. In one embodiment, gas turbine engine 10 is a GE90 engine available from General Electric Company, Cincinnati, Ohio. Engine 10 is mounted to an aircraft (not shown) by a mounting system 18 coupled to an aft mounting frame 30.

One or more mounting system links 32 couple engine 10 to aft mounting frame 30. More specifically, each link 32 extends between aft mounting frame 30 and an engine core casing 36. At least one thrust link 40 is included within an aft mount for reacting thrust generated by the engine 10. Thrust link 40 is coupled at a first end 42 to the aft mounting frame and at a second end 44 to a stationary engine structure, such as an engine front frame 46.

Figure 2:
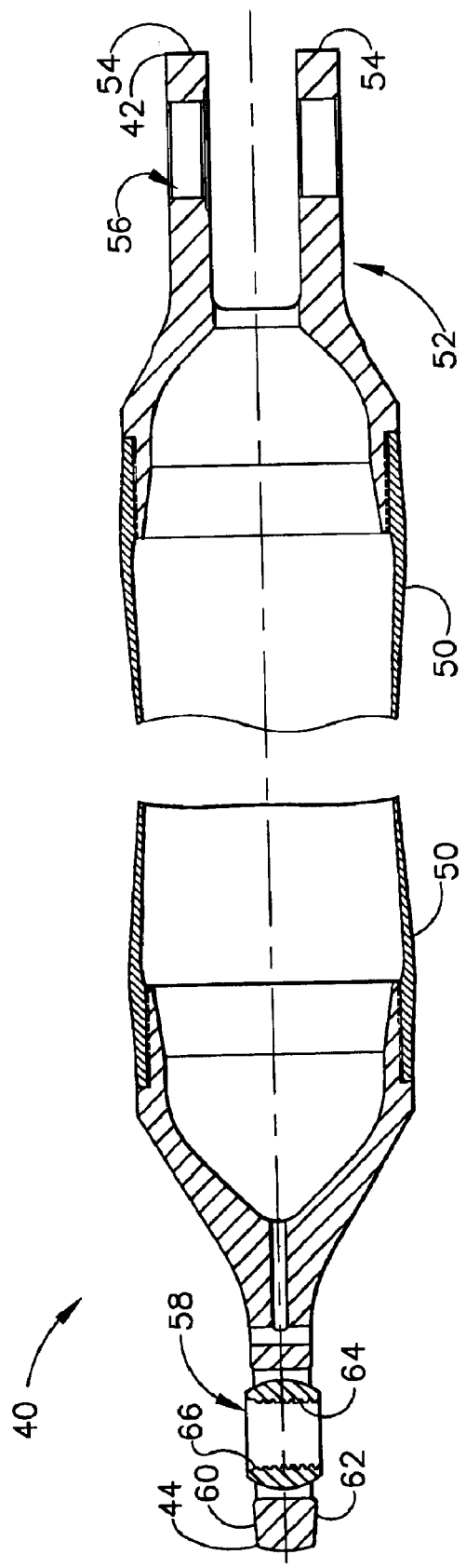
FIG. 2 is a perspective view of a thrust link used with the engine mounting system shown in FIG. 1.

FIG. 2 is an enlarged perspective view of thrust link 40 including an elongated span section 50. Thrust link end 42 includes a connector 52 formed thereon. Connector 52 is in the form of a clevis and includes a pair of axially extending, parallel arms 54 which include an opening 56 formed therein. Thrust link end 44 includes an opening 58 extending from a first side 60 of thrust link 40 to a second side 62 of thrust link 40. Each opening 58 is defined by an inner surface 64 including a plurality of threads 66. Threads 66 extend between first and second sides 60 and 62, respectively.

Figure 3:
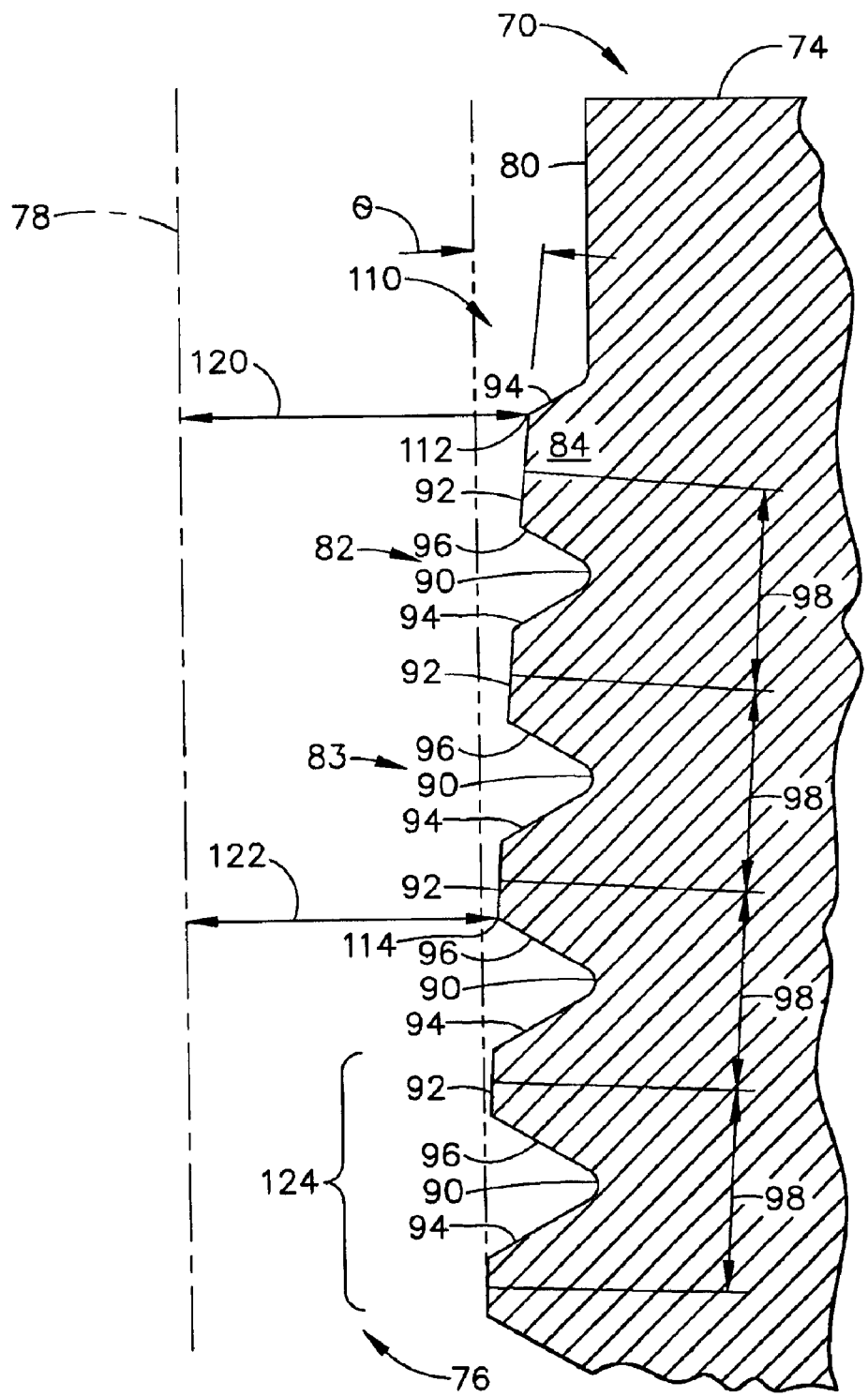
FIG. 3 is an enlarged partial cross-sectional view of a connector that may be used with the thrust link shown in FIG. 2.
Figure 4:
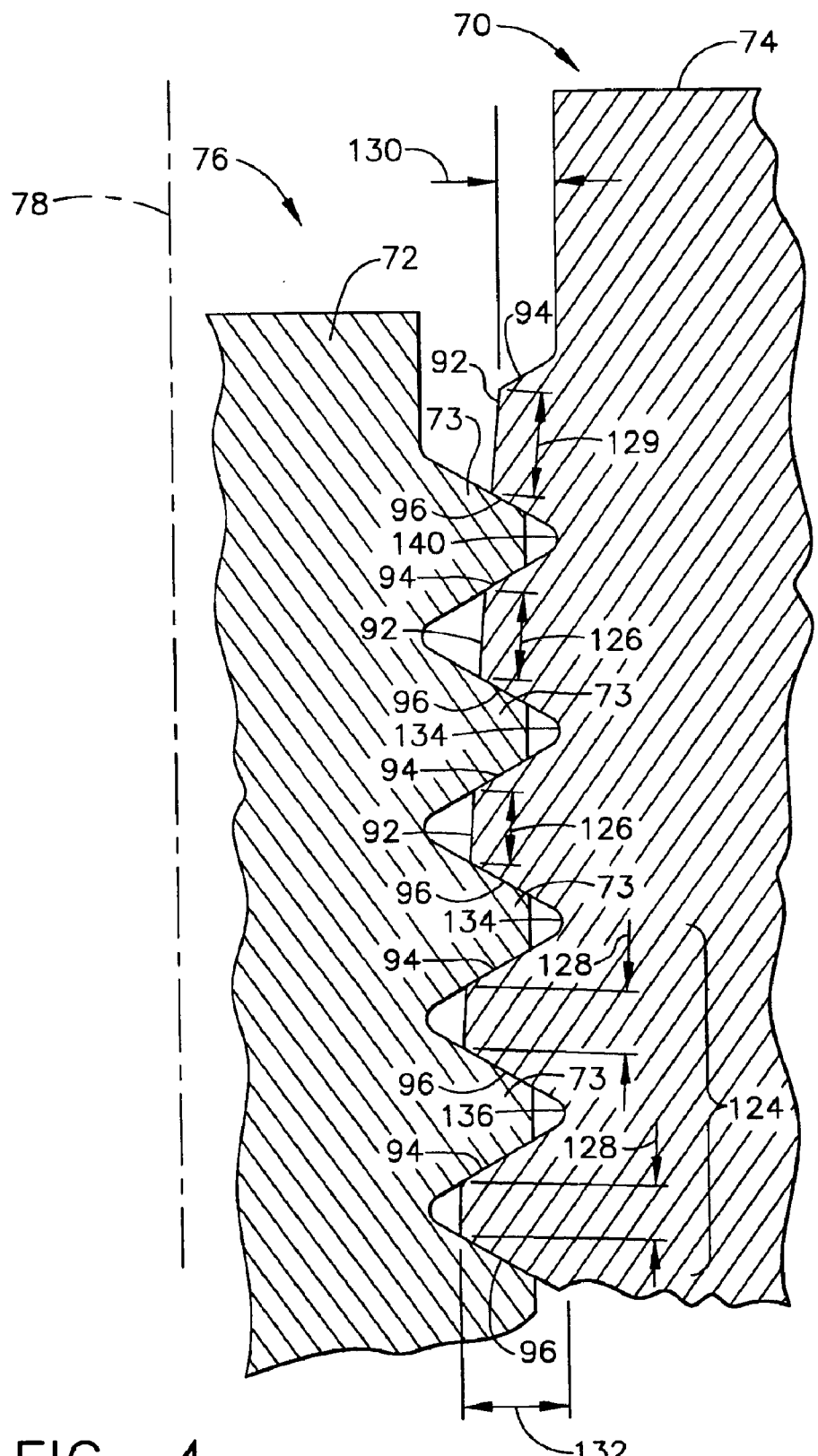
FIG. 4 is an enlarged partial cross-sectional view of the connector shown in FIG. 3 and coupled to a threaded apparatus.

FIG. 3 is an enlarged partial cross-sectional view of a connector 70 that may be used with thrust link 40 (shown in FIGS. 1 and 2). FIG. 4 is a partial cross-sectional view of connector 70 coupled to a threaded apparatus 72. Alternatively, connector 70 may be coupled to any other suitable threaded fastening device or retaining device used to couple components within a gas turbine engine, such as gas turbine engine 10 shown in FIG. 1. Apparatus 72 includes a plurality of threads 73. Threads 73 are known as male threads.

Connector 70 includes a first surface 74, an axially spaced second surface (not shown), and an opening 76 extending therebetween. Connector 70 also has a center axis of symmetry 78 extending between first surface 74 and the second surface.

Connector opening 76 is defined by an inner surface 80 including a plurality of threads 82. In one embodiment, threads 82 extend between connector first surface 74 and the connector second surface. Threads 82 are known as female threads, and are sized to receive apparatus threads 73. Threads 82 are arranged in a threadform 83 which includes a first thread portion 84. First thread portion 84 is the closest thread 82 within threadform 83 to connector first surface 74. Each thread 82 includes a root 90 and a truncated crest or cantilever 92 connected to root 90 with an upper surface 94 and a lower surface 96. Threads 82 are axially-spaced within threadform 83, such that a distance 98 between adjacent threads 82 is substantially identically through threadform 83.

Threadform 83 also includes a cutback 110. In one embodiment, cutback 110 is machined into threadform 83. Cutback 110 includes a first end 112 that is adjacent first thread portion 84 and a second end 114 that is between first thread portion 84 and the connector second end. More specifically, cutback 110 extends from first thread portion upper surface 94 through first thread portion crest 92 to a lower surface 96 of a thread 82. In the exemplary embodiment, cutback 110 extends from first thread portion upper surface 94 through two subsequent threads 82 within threadform 83.

Cutback 110 is oblique with respect to center axis of symmetry 78.

More specifically, cutback 110 extends obliquely outward at an angle θ measured with respect to center axis of symmetry 78. Accordingly, cutback first end 112 is a first distance 120 from center axis of symmetry 78 that is longer than a second distance 122 that cutback second end 114 is located from center axis of symmetry 78. Accordingly, a diameter (not shown) of connector opening 76 measured with respect to cutback 110 is larger than a diameter (not shown) of connector opening 76 within a remaining portion 124 of threadform 83 that is not within cutback 110.

Furthermore, because cutback 110 is oblique, a length 126 of each respective thread crest 92 within cutback 110 measured between each respective thread upper and lower surface 94 and 96, is longer than a length 128 of each respective thread crest 92 within threadform portion 124. More specifically, a length 129 of first thread portion crest 92 is longer than other thread crest 92 within cutback 110. In addition, each thread crest length 128 within threadform portion 124 is substantially identical between threads 82. Accordingly, crests 92 within cutback 110 extend radially outward from connector inner surface 80 a shorter distance 130 than a distance 132 that crests 92 within threadform portion 124 extend from surface 80. As a result, a cross-sectional area of each thread root fillet 134 defined within cutback 110 are smaller than cross-sectional areas of each thread root fillet 136 defined within threadform portion 124. More specifically, a root fillet 140 of first thread portion 84 is smaller than any other root fillet 134 within cutback 110, and a stiffness factor of first thread portion 84 is less than that associated with that of other threads 82 within threadform 83. Furthermore, thread crests 92 within threadform portion 124 are substantially co-planar and are substantially parallel to center axis of symmetry 78.

During assembly, threaded apparatus 72 is coupled to connector 70. More specifically, threaded apparatus 72 is rotated within connector opening 76 to initially engage threadform first thread portion 84 and cutback 110. As threaded apparatus 72 is torqued to be secured to connector 70, cutback 110 facilitates less stresses being induced into first thread portion 84. More specifically, because first thread portion root fillet 140 is smaller than other root fillets 134 and 136 defined within connector 70, an amount of loading that may be transferred into first thread portion 84 is reduced in comparison to other threads 82. As a result, a peak stress induced in a thread root radius for both male and female threads 73 and 82, respectively, is reduced, and loading is facilitated to be more evenly transferred through threadform 83. In addition, if an explosive event occurs within engine 10, threadform 83 facilitates absorbing impact loading that may be induced from engine 10. Accordingly, reducing an amount of stress induced into threadform 83 facilitates extending a useful life of connector 70.

The above-described connector is cost-effective and highly reliable. The connector includes a cutback that extends obliquely through the first thread portion of a threadform. The cutback reduces a stiffness factor and a cross-sectional root fillet of the first thread portion, such that when a threaded apparatus is coupled to the connector less stresses are induced into the threadform. More specifically, because the first thread portion has a smaller cross-sectional root fillet in comparison to the remaining portion of the threadform, less loading is transferred through the first thread, and a peak stress in the thread root radius for both the male and female threads is reduced. As a result, the connector facilitates evenly transferring loading through the threadform to reduce stresses induced within the threadform, thus extending a useful life of the connector.

While the invention has been described in terms of various specific embodiments, those skilled in the art will recognize that the invention can be practiced with modification within the spirit and scope of the claims.

What is claimed is:

1. A gas turbine engine assembly comprising:

a gas turbine engine comprising a longitudinal axis; and
   a thrust link having a longitudinal axis substantially aligned with respect to said engine longitudinal axis, said thrust link comprising at least a portion of an engine mount for said gas turbine engine and comprising a first connector, a second connector, and a span section extending therebetween, said first connector comprising a first side, a second side, and an opening extending therebetween and defined by an inner surface, said inner surface comprising a plurality of threads extending radially outward into said connector opening such that said threads are axially spaced substantially constant along said inner surface, said plurality of threads comprises a first thread portion positioned proximate said first side and initially engaging a threaded apparatus coupled to said first connector, said plurality of threads comprising a cutback, wherein said cutback extends through said first thread portion, said first connector coupled to said turbine engine, said cutback configured to facilitate reducing stresses induced into said plurality of threads.

2. A gas turbine engine assembly in accordance with claim 1 wherein said thrust link connector opening has a center axis of symmetry extending from said connector first side to said connector second side, said cutback oblique with respect to said center axis of symmetry.

3. A gas turbine engine assembly in accordance with claim 2 wherein each said thread comprises a crest and a root, said cutback extending through said first thread portion crest.

4. A gas turbine engine assembly in accordance with claim 3 wherein said thrust link connector first thread portion is positioned adjacent at least one of said connector first side and said connector second side.

5. A gas turbine engine assembly in accordance with claim 3 wherein said thrust link connector cutback comprises a first end and a second end, said cutback first end extending through said thrust link connector first thread portion, said cutback second end between said connector first thread portion and said thrust link connector second side.

6. A gas turbine engine assembly in accordance with claim 5 wherein said thrust link connector cutback first end is positioned a first distance from said thrust link connector opening center axis of symmetry, said thrust link connector cutback second end is positioned a second distance from said thrust link connector opening center axis of symmetry.

7. A gas turbine engine assembly in accordance with claim 6 wherein said thrust link connector cutback first distance is longer than said thrust link second distance.

8. A gas turbine engine assembly in accordance with claim 1 wherein said thrust link connector cutback is further configured to reduce a stiffness factor of at least a portion of said plurality of threads.

* * * * *

UNITED STATES PATENT AND TRADEMARK OFFICE
CERTIFICATE OF CORRECTION

| | |
|---|---|
| PATENT NO. | : 6,959,553 B2 |
| APPLICATION NO. | : 10/684244 |
| DATED | : November 1, 2005 |
| INVENTOR(S) | : Anderson |

Page 1 of 1

It is certified that error appears in the above-identified patent and that said Letters Patent is hereby corrected as shown below:

In Claim 7, column 6, line 6, between "link" and "second" insert -- connector cutback --.

Signed and Sealed this

Sixth Day of November, 2007

JON W. DUDAS
*Director of the United States Patent and Trademark Office*